Dec. 23, 1941.  R. A. NORBOM  2,266,790
MEANS FOR LOCKING CONTAINERS ON VEHICLES
Filed Aug. 2, 1940  3 Sheets-Sheet 1

Dec. 23, 1941.  R. A. NORBOM  2,266,790
MEANS FOR LOCKING CONTAINERS ON VEHICLES
Filed Aug. 2, 1940  3 Sheets-Sheet 2
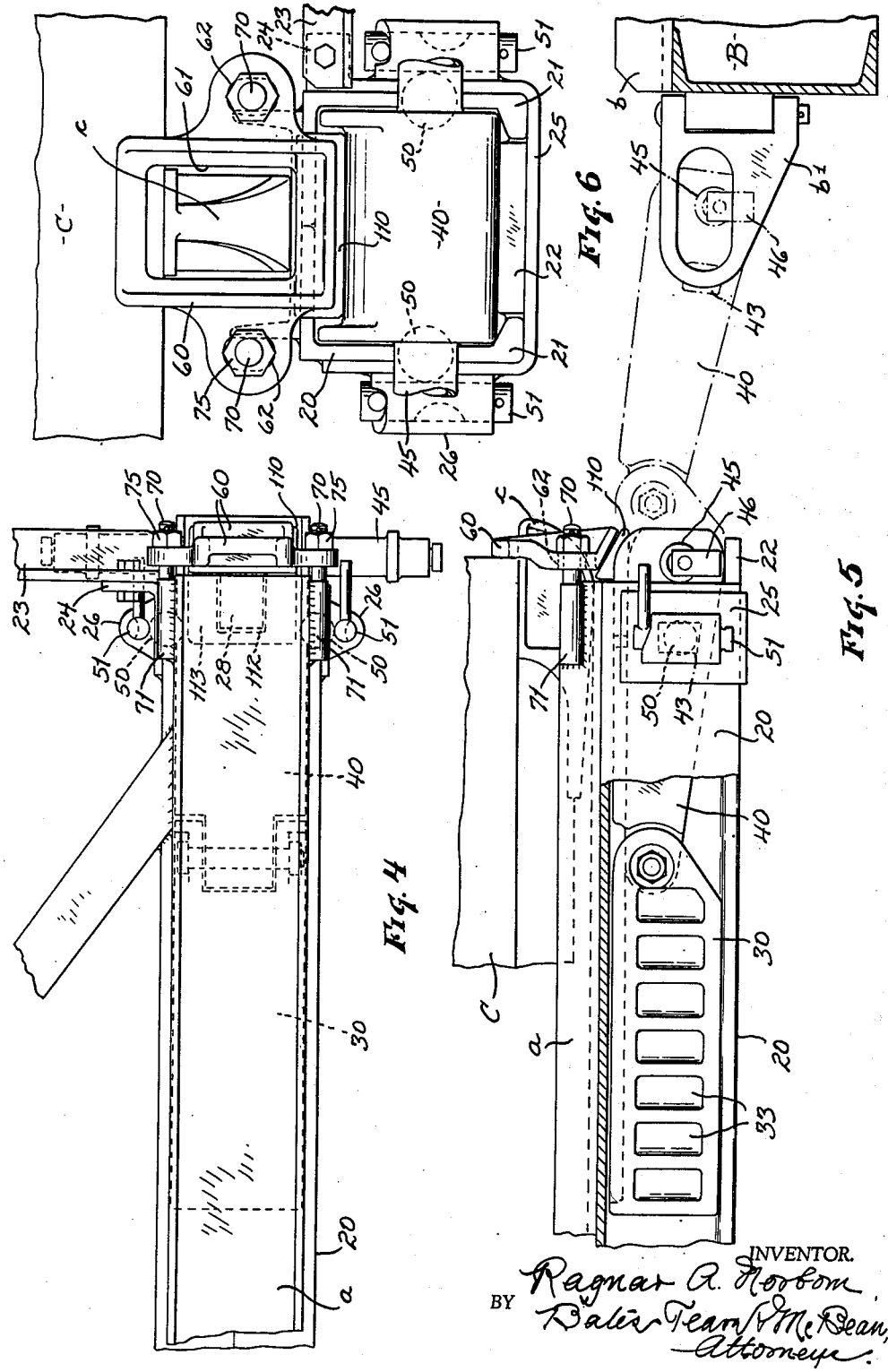
INVENTOR.
Ragnar A. Norbom
BY Bates, Teare & McKean,
Attorneys.

Dec. 23, 1941.  R. A. NORBOM  2,266,790
MEANS FOR LOCKING CONTAINERS ON VEHICLES
Filed Aug. 2, 1940  3 Sheets-Sheet 3
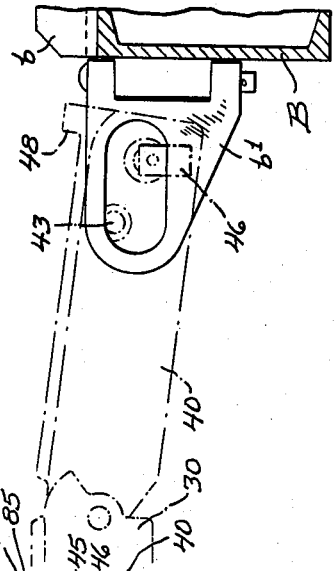
Fig. 9
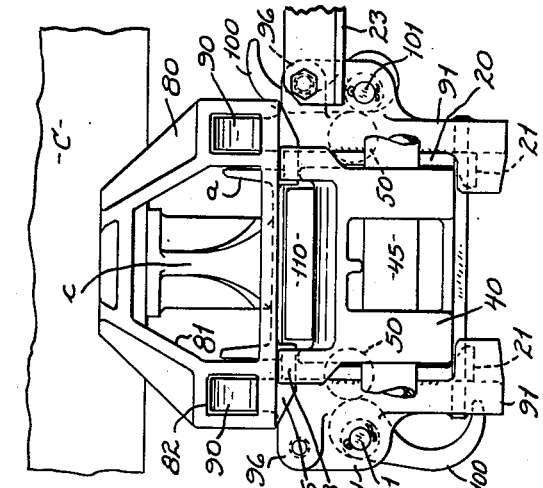
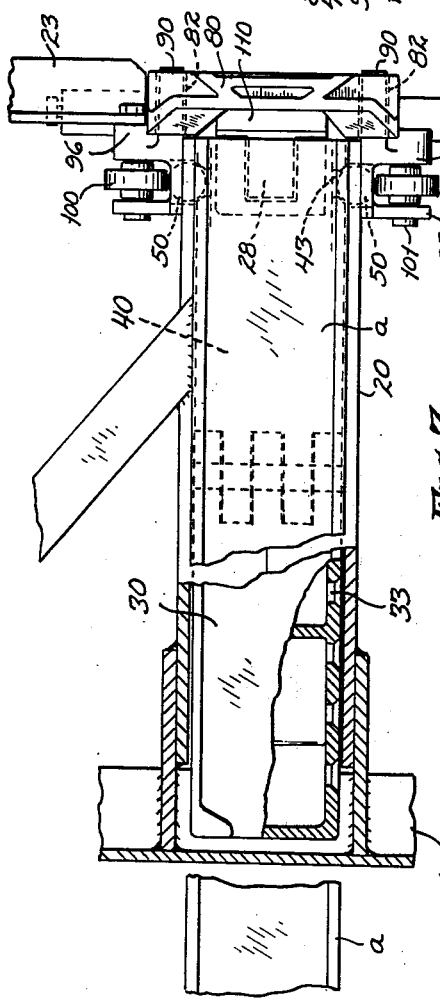
Fig. 7
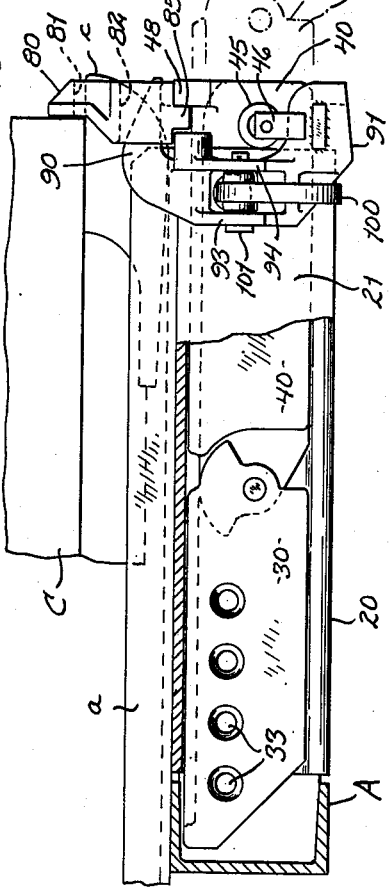
Fig. 8
INVENTOR.
Ragnar A. Norbom
BY Bakis, Jean McBean,
Attorneys.

Patented Dec. 23, 1941

2,266,790

UNITED STATES PATENT OFFICE 2,266,790

MEANS FOR LOCKING CONTAINERS ON VEHICLES

Ragnar A. Norbom, New York, N. Y., assignor to National Fitch Corporation, New York, N. Y., a corporation of Delaware Application August 2, 1940, Serial No. 349,697

11 Claims. (Cl. 214—85)

This invention relates to a vehicle adapted to transport a demountable body and is concerned especially with means for locking such body on the vehicle. The vehicle is preferably of the type having parallel transverse channels which receive skid rails on the underside of a body. In use, the vehicle is placed alongside of a railway car and connected with it by suitable bridges carried by the vehicle which causes the channels of the vehicle to align with channels on the railway car. Then suitable mechanism on the vehicle may propel a demountable body either from the truck to the railway car or from the railway car to the truck. After the body is on the truck and, before the truck starts on its way to transport the body, it is desirable to firmly lock the body to the truck, and the present invention provides for so locking it.

Two forms of the locking mechanism are illustrated in this application, one operated manually independently of the connecting bridges, the other is operated by the action of drawing the bridge into its idle position on the truck so that the locking of the bridge in such idle position automatically locks the container to the truck. These mechanisms are hereinafter more fully explained in connection with the drawings and the essential novel features are summarized in the claims.

Figure 1:
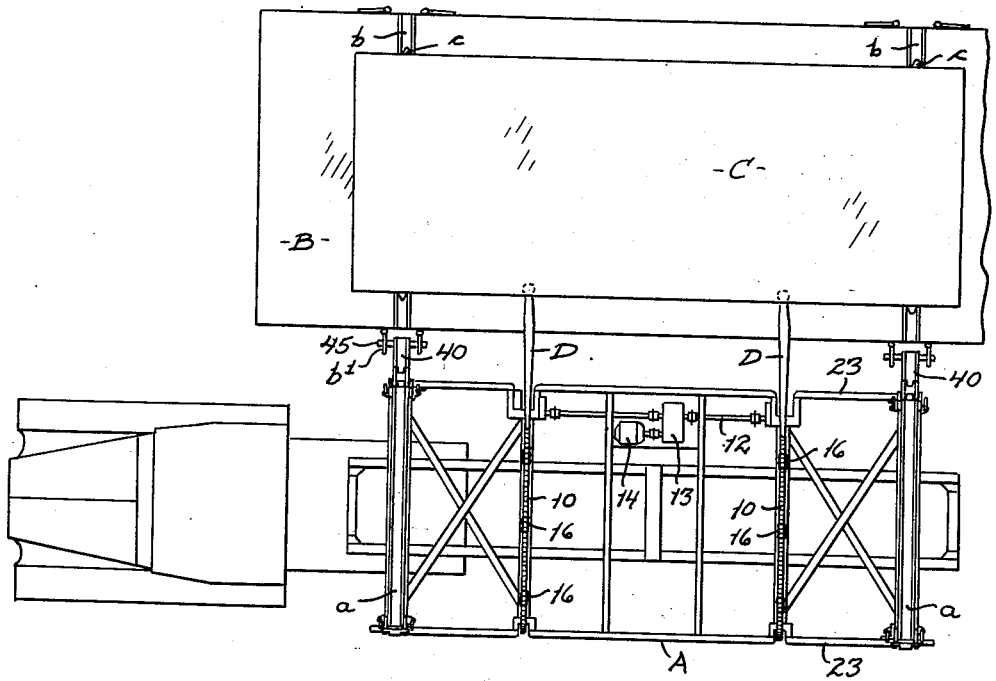
Figure 2:
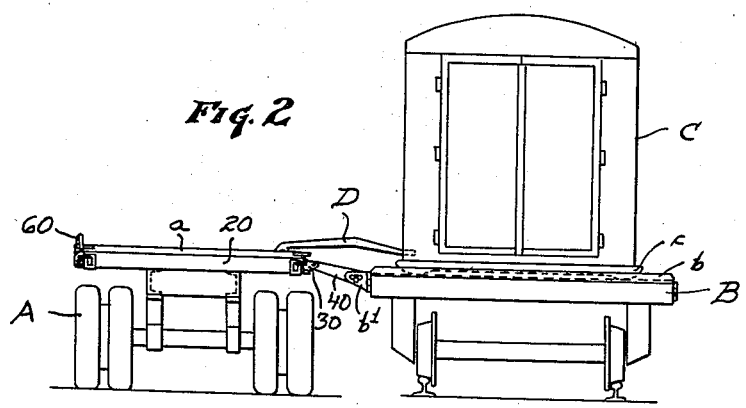
Figure 3:
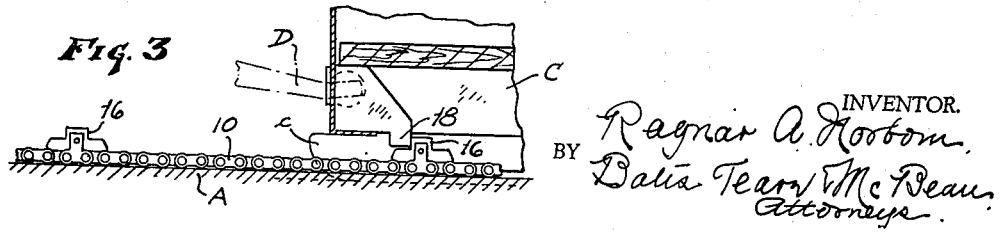

In the drawings, Fig. 1 is a plan of a highway truck, a railway car and a container mounted on the car and coupled with propelling mechanism on the truck ready for a transfer of the demountable body to the truck across the bridges connecting the truck to the car; Fig. 2 is an end elevation of the highway truck, railway car and demountable body, showing the body just as it is about to leave the railway car for deposit on the truck or just after it has completed this movement from the truck to the railway car; Fig. 3 is a fragmentary elevation of a portion of the propelling chain on the truck and a portion of the container directly engaged thereby; Fig. 4 is a plan of a portion of one of the guiding channels on the highway truck, showing the accompanying manual mechanism for locking the container with its skid rail in such channel, this view showing the bridge in its idle position telescoped into the truck; Fig. 5 is a side elevation of the parts shown in Fig. 4, but showing also, in broken lines, the active position of the bridge; Fig. 6 is an end elevation looking at the end of the idle bridge and at the locking stirrup which embraces the skid rail of the container on the truck; Figs. 7, 8 and 9 are respectively a plan, a side elevation and end view of the supporting channel, the bridge and the locking mechanism of an embodiment where the container lock is operated automatically by the bridge itself.

Referring first to Figs. 1 and 2 of the drawings, A represents a highway truck (which may comprise a tractor and a trailer), B a railway car, C a demountable container adapted to stand either on the car or the truck. As illustrated, the container is a considerable size and is adapted for mounting on the car or truck lengthwise thereof and shifted laterally across the side of one of such vehicles to the other.

As shown, the container has skid rails $c$ on its base, which are adapted to occupy upwardly facing channels $a$ on the truck and $b$ on the car. To propel such container from the truck to the car or vice versa, I may employ, if desired, the mechanism illustrated in Figs. 1 and 2. While this mechanism in itself forms no part of this application, it is convenient to describe it at this point, so far as it is shown in Figs. 1 and 2.

As shown, there is mounted transversely of the truck a pair of endless propelling chains 10 looped around suitable sprocket wheels, not shown, adjacent the edges of the truck. One sprocket wheel for each train may be coupled to a shaft 12 which is connected, through reduction gearing in housing 13 with a driving motor 14, so that the motor may move the two chains in unison.

Each sprocket chain is adapted to coact with the container to shift the same to and from the highway truck. For this purpose, the chain has periodic projections 16 (extending upwardly from the upper reach of the chain) which coact with downward projections 18 on the bottom of the body to start the movement of the body from the truck. After it is moved some distance one attaches push-and-pull bars D to the chains and body, which thereafter by the movement of the chain complete the shoving of the container across the bridges onto the railway car.

The reverse operation may withdraw the container from the railway car onto a highway truck, the push-and-pull bars first pulling the container well onto the truck, and then after the push-and-pull bars are removed, the direct engagement of the chain completes the transfer operation.

To tie the truck to the railway car, notwithstanding different elevations thereof and varying distances between the two vehicles, I provide the bridges heretofore mentioned which are carried by the truck and are adapted to be attached at their free ends to the railway car. Preferably, these bridges hereinafter more fully described, are articulated shiftable devices composed of a sliding member mounted in a housing carried by the truck and a member pivoted to the sliding member, there being means carried by the housing to lock the sliding member while extending various distances from the side of the truck depending on its spacing from the adjacent railway car.

The transverse guiding channels $a$ on the truck are mounted on transversely extending hollow beams of the truck frame. These hollow beams are shown more particularly at 20 in Figs. 4, 5 and 6. They may be made up of channels 21 with their webs vertical and flanges horizontal, the upper flanges abutting, and there being an intermediate spacing bar 22 between the lower flanges, as shown in Fig. 6. All of these parts are welded together and channel $a$ resting on top of the beam is welded to it. This makes a very firm construction and constitutes not only an effective supporting beam for the guiding channel which receives the skid rail of the container, but constitutes also an open ended housing for the telescopically mounted bridge. The two housings may be braced by longitudinal frame bars 23 at the edges of the truck connected to the adjacent sides of the housing by angle clips 24.

As shown for example, in Fig. 5, the bridge comprises a sliding member 30 in the housing, and a swinging member 40 pivoted to the member 30 and adapted to occupy the housing when the bridge is in idle position, but in use, being beyond the housing and connected at its far end to the railway car. I have shown the swinging member 40 of the bridge provided at its free end with a transverse bar 45 which is adapted to coact with wings $b$—$i$ on the side of the railway car, these wings having openings through which a bar 45 may pass as indicated in Fig. 5, and the bar may carry a loose rod with downwardly projecting ends 46 for preventing the inadvertent withdrawal of the bar from the wings. The construction in this regard is that shown and claimed in Patent No. 2,126,763 of Benjamin F. Fitch.

Near the end of the housing 20, it is reinforced by a U-shaped strap 25 welded to it. In the vertical walls provided by the channels of the housing and this reinforcing strap are horizontal recesses occupied by a pair of balls 50, one on each side of the bridge. The bridge member 30 is provided with a series of recesses 33 in its sides. Now, if the balls occupy any of these recesses and are held in place therein, such action locks the bridge to the housing, whereas if the balls are free from these recesses, the bridge may be drawn in and out of the housing.

Suitable cam mechanism is provided to force the balls into those recesses which stand between the two balls, according to the position of the bridge. When the highway truck has been located alongside the railway car and the bridge drawn out and the free end of the swinging member attached to the car, then the balls are forced toward each other into the one pair of the recesses 33 registering with the balls. As the bridges may be shifted in or out slightly after its attachment to the car (due to the slots in the wings $b$—$i$ it is possible with any setting of the truck to bring notches directly between the balls.

To force the balls into the notches, I may employ rotatable grooved pins, such as shown at 51 in Figs. 4, 5 and 6. These pins are rotatably carried in sleeves 26 welded to the outer faces of the reinforcing strap 25; each pin has a groove, which, when it is facing the ball, receives a sufficient portion thereof so that the inner portion of the ball clears the bridge, while when the pin is turned 180°, it cams the ball inwardly. In this inward position, indicated in Fig. 6, the balls lock the bridge to the truck housing.

In place of the locking mechanism comprising the rotatable pins 50, just outlined, I may employ a vertical cam lever swinging on a horizontal axis and which when turned down has a cam portion acting on the ball to force it inwardly and there hold it. Such a lever is illustrated in Fig. 9 and will be described in connection with the automatically locking embodiment. Claims on the bridge locking mechanism per se, either by rotatable pins or by pivoted levers are made in a copending application of mine, Serial No. 349,696, filed August 2, 1940.

60 in Figs. 4, 5 and 6 indicates a stirrup or frame with an opening 61, adapted to be passed over the projecting end of the skidrail $c$ on the body. When so positioned, two openings 62 in the frame, on opposite sides of the skidrail opening 61, pass onto a pair of parallel supporting projections on the opposite side of the guide rail $a$. In Figs. 4, 5 and 6, the projections are pins 70 carried by sleeves 71 welded to opposite sides of the channel $a$, and these pins pass through the openings 62 in the stirrup and have threaded ends which may receive nuts 75.

When the nuts 75 are applied they force the stirrup tightly against the body near the top of the stirrup and against a suitable abutment near the bottom of the stirrup as indicated in Fig. 5. This effectively locks the container to the channel supporting it, and insures the container being held definitely in place on said truck.

In place of securing the stirrup 60 by the nuts 75, as above described, I may employ the construction illustrated in Figs. 7, 8 and 9 where the stirrup 80 is guided by parallel frame projections 90 but is retained in place by a projection on the end of the swinging bridge member 40.

With the arrangement just outlined, the guiding projections 90 are fingers projecting from brackets 91 welded to the sides of the housing 20, and after the stirrup 80 has been put in place by sliding its minor openings 82 over these guiding projections, the main opening 81 of the stirrup will extend over the skidrail $c$ in a similar manner to the stirrup 60 of the preceding figures. However, to retain the stirrup in that position, one simply shoves the articulated bridge into its housing as far as possible, whereupon the projections 48, extending upwardly from the free end portion of the swinging bridge at the sides of the channel thereof, come into engagement with downward projections or surfaces 85 on the stirrup 80 so that the bridge will hold the stirrup in place. Then it is only necessary to lock the bridge in the housing.

The locking of the bridge in the housing is effected by forcing the locking balls 50 into recesses 43 in the swinging portion of the bridge, which when the bridge is entirely within the housing register with the balls. Accordingly, in this embodiment, after the stirrup is put in place, and the bridge shoved home, the operation of the cams to lock the bridge causes the locking of the stirrup, thereby locking the container on the truck.

The locking balls 50 in the automatic embodiment could be forced inwardly to locking position by rotatable pins similar to those of the manual embodiment. I prefer, however, to use simple cam levers 100 mounted on horizontal pins 101, carried by the brackets 91. As shown in Figs. 7 and 8, these brackets 91 have recesses in their sides which leave projecting plate-like portions 93 and 94 on opposite sides of the recess. The lever 100 occupies the recess and the pin 101 passes through it into the plate-like portions of the brackets.

When the handle of the lever 100 projects upwardly, as indicated in the right hand portion of Fig. 9, the corresponding ball is free from the bridge. When, however, the cam is turned down into the lower position as shown at the left hand of Fig. 9, the ball is forced into the recess of the bridge, thereby locking it. This same locking operation, of course, is used for locking the sliding member of the bridge in various extended positions for use, and also for locking the pivoted member of the bridge in the housing during the idle condition of the bridge.

The brackets 91 are formed with bosses 96 and the adjacent ones of these bosses on two housings form anchorages for a longitudinal brace bar 23 at the side of the truck frame, which may be secured to the boss by a bolt passing into a threaded opening.

To make an easy guiding ramp from the top of the bridge to the somewhat higher channel a, I provide a block 110 (Figs. 4, 5 and 9, for instance), having an upward inclined face. This block rests on top of the bridge which slides freely beneath it, but the block is anchored to the underside of the top of the housing 20 by means of a projection 28 of the housing (shown in dotted lines in Fig. 4), occupying an opening 112 in a plate-like inward extension 113 of the block.

It will be seen that whatever form of container lock is employed, the articulated bridge when put into idle position is locked in that position by a suitable cam device shown. Now in the first form of locking stirrup shown, the stirrup is preferably applied after the bridge has been pushed into idle position, and may be very quickly secured by turning on the nuts 75 by a socket wrench. In the second form of lock, the stirrup is applied before the bridge is pushed entirely home to idle position. Then, the pushing of the bridge the rest of the way in and locking it by a cam mechanism completes the operation.

I claim:

1. A vehicle having guideways to receive skidrails of a demountable body which may be carried by the vehicle, a stirrup having an opening adapted to extend over the projecting end of a skidrail of a demountable body on the vehicle, means carried by the vehicle engaging the stirrup on opposite sides of its skidrail opening for guiding it into retaining position, and means for locking the stirrup in such retaining position.

2. A highway truck having guideways to receive a demountable body which may be carried by the truck, a pair of parallel projections carried by the truck adjacent opposite sides of the guideways, a stirrup having an opening adapted to extend over a projection on the body when it is on the guideways, with the guiding projections carried by the truck extending through openings in the stirrup to support and guide it, and means for locking the stirrup in its active position.

3. A vehicle having a pair of parallel channels to receive the skidrails of a demountable container, a lock to hold the container in place in the channels of the vehicle, said lock comprising a removable stirrup having an opening adapted to extend over the projecting end of the skidrail with the inner face of the stirrup bearing against the side of the container above the rail, openings in the stirrup and projections on the vehicle slidably occupying the last-mentioned openings to position the stirrup, and means for forcing the stirrup toward the vehicle and holding it there to lock the container in place.

4. In combination, a highway truck, a pair of upwardly facing channels thereon adapted to receive skidrails of a container, stirrups adapted to extend over the projecting ends of the skidrails for purposes of locking them to the truck, a pair of guiding members adjacent opposite sides of each channel respectively, and coacting with the stirrups, and means bearing against the stirrups for forcing them toward the container, when it is in position on the truck, whereby the container may be locked to the truck.

5. The combination of a vehicle, a channel carried thereby, a container having a skidrail adapted to occupy the channel, the skidrail projecting at its end beyond the side of the container, a locking stirrup having an opening adapted to receive the projecting end of the skidrail, said stirrup having a pair of openings at opposite sides respectively of its main opening, a pair of threaded projections carried by opposite sides of the channel adapted to extend through such minor openings of the stirrup, and nuts screwing onto the projections for holding the stirrup in place.

6. The combination of a vehicle, a container having a skidrail adapted to rest thereon, the skidrail projecting at its end beyond the side of the container, a locking stirrup having an opening adapted to receive the projecting end of the skid rail, and threaded members bearing against the outer face of the stirrup to force it into locking position, the upper portion of the stirrup bearing against the side wall of the container and the lower portion against an abutment carried by the vehicle.

7. The combination of a truck having channels adapted to receive the skidrails of a container, bridges pivotally carried by the truck and adapted to be connected to a railway car, inclined ramp blocks leading from the tops of the bridges to the channels, locking stirrups having openings adapted to extend over the projecting end of the skidrails, the upper end of the stirrup engaging the side of the container and the lower portion of the stirrup being inclined and engaging the upper face of the ramp blocks, and means for holding the stirrup in said locking position.

8. The combination of a vehicle adapted to support a demountable container, a retaining device having a portion adapted to engage such container, said device having a pair of openings, a pair of projections carried by the vehicle and adapted to extend through such openings of the retaining device for positioning it, a bridge telescopically carried by the vehicle, means whereby the bridge when telescoped holds the retaining device in place on the projections and in locking engagement with the container.

9. The combination of a vehicle adapted to support a container, a pair of articulated bridges telescopically mounted on the vehicle and comprising a sliding member and a swinging member pivoted to the outer end of the sliding member, said swinging member having its free end provided with means for attachment to a car or platform, a retaining device adapted to engage the container, the free end of the swinging bridge being provided with an upward projection, which, when the bridge is shoved to its idle position, may overlap the retaining device and hold it in place, and a lock coacting with the swinging portion of the bridge when in idle position to lock it and thereby lock the retaining device.

10. The combination of a highway truck having a pair of open ended housings with guiding channels supported on the upper side of the housings and adapted to receive skidrails of a container, a pair of articulated bridges telescopically mounted in the housings and comprising a sliding member and a swinging member pivoted to the outer end of the sliding member, said pivoted member having its free end provided with means for attachment to a car or platform, a stirrup adapted to engage over the projecting end of the skidrail of the container, the swinging bridge being provided with means which, when the bridge is shoved to its idle position in the housing may engage the stirrup and hold it in place, and a lock coacting with the swinging portion of the bridge when in idle position to lock it in the housing.

11. The combination of a highway truck, a pair of hollow beams carried thereby constituting parallel housings, channels mounted on the upper face of said beams constituting guideways for skidrails on the under side of a container, an articulated bridge telescopically mounted in each of the housings, each bridge comprising a sliding member adapted to occupy the housing, and a member pivoted to the sliding member and having its free end provided with means for attachment to a platform or railway car, said swinging portion also adapted to telescope within the housing when the articulated bridge is in idle position, a device to engage the projecting end of the skidrail for the purpose of locking it to the container, a projection on the swinging portion of the bridge adapted to engage said device to hold it in locked position, and a locking member carried by the housing and adapted to coact with the swinging bridge member to lock it in idle position at the time the bridge member locks said locking device in its active position.

RAGNAR A. NORBOM.